(12) United States Patent
Kurz

(10) Patent No.: US 6,554,549 B1
(45) Date of Patent: Apr. 29, 2003

(54) TOOL WITH A BASE BODY AND METHOD FOR FORMING BORES IN A WORK PIECE USING SUCH A TOOL

(75) Inventor: Artur Kurz, Wendlingen (DE)

(73) Assignee: Mapel Fabrik fur Prazisionswerkzeuge Dr. Kress KG (DE)

( * ) Notice: Subject to any disclaimer, the term of this patent is extended or adjusted under 35 U.S.C. 154(b) by 0 days.

(21) Appl. No.: 09/423,942

(22) PCT Filed: May 15, 1998

(86) PCT No.: PCT/EP98/02868

§ 371 (c)(1),
(2), (4) Date: Feb. 2, 2000

(87) PCT Pub. No.: WO98/52710

PCT Pub. Date: Nov. 26, 1998

(30) Foreign Application Priority Data

May 16, 1997 (DE) .......................... 197 20 823

(51) Int. Cl.$^7$ .................... B23B 35/00; B23B 41/12
(52) U.S. Cl. ..................... 408/1 R; 408/2; 408/54; 408/56; 408/81; 408/150; 408/153; 408/708
(58) Field of Search ................ 408/1 R, 2, 54, 408/56, 57, 67, 80, 81, 82, 83, 93, 150, 153, 158, 160, 708, 151

(56) References Cited

U.S. PATENT DOCUMENTS

| | | | |
|---|---|---|---|
| 2,207,861 A | 7/1940 | Healy | |
| 3,191,294 A | * 6/1965 | Daugherty | 408/2 |
| 3,438,288 A | 4/1969 | Kaiser | |
| 3,457,810 A | * 7/1969 | Lewis et al. | 408/708 |
| 3,591,304 A | 7/1971 | Galbarini | |
| 3,740,160 A | * 6/1973 | Kimura et al. | 408/2 |
| 3,961,857 A | 6/1976 | Koblesky | |
| 4,666,350 A | 5/1987 | Nicholas | |
| 4,693,642 A | * 9/1987 | Mair et al. | 408/708 |
| 4,954,023 A | * 9/1990 | Bromley | 408/1 R |
| 5,540,526 A | * 7/1996 | Hyatt et al. | 408/708 |
| 5,865,575 A | 2/1999 | Kress | 408/57 |
| 6,287,057 B1 | * 9/2001 | Kurz | 408/2 |

FOREIGN PATENT DOCUMENTS

| | | | | |
|---|---|---|---|---|
| DE | 1917646 | 11/1969 | | |
| DE | 19540374 | 5/1997 | | |
| JP | 33210 A | * 4/1981 | | 408/708 |
| JP | 4504 A | * 1/1987 | | 408/54 |
| SU | 498100 A | * 4/1976 | | 408/54 |
| SU | 691248 A | * 10/1979 | | 408/54 |
| SU | 1240510 | * 6/1986 | | 408/83 |

* cited by examiner

*Primary Examiner*—Daniel W. Howell
(74) *Attorney, Agent, or Firm*—Ostrolenk, Faber, Gerb & Soffen, LLP

(57) ABSTRACT

A tool having a base body which carries cutters for machining bores in a workpiece, the cutters being arranged coaxially with one another. The base body further has at least one lifting element, with which the base body can be moved from an eccentric position in relation to an axis of the workpiece bores into a central position, in which the axis of the tool coincides with the axis of the workpiece bores.

49 Claims, 15 Drawing Sheets

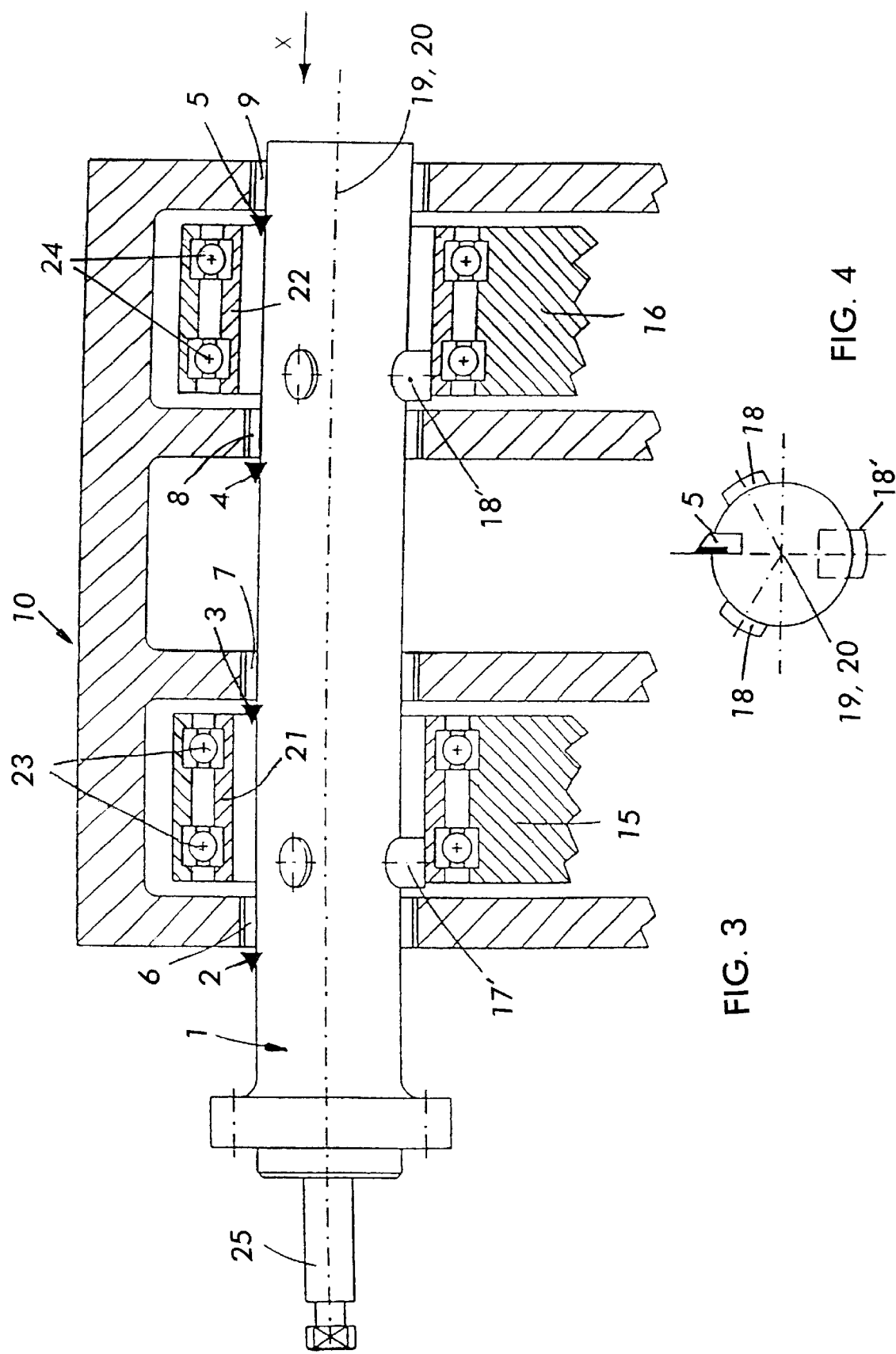

US 6,554,549 B1

TOOL WITH A BASE BODY AND METHOD FOR FORMING BORES IN A WORK PIECE USING SUCH A TOOL

FIELD OF THE INVENTION

The invention relates to a tool for machining bores in a workpiece and to a method of using this tool.

BACKGROUND OF THE INVENTION

A tool for machining bores arranged axially and spaced from one another in a workpiece is known. Since the bores often have identical diameters and arranged coaxially with one another, the tool cutters are permanently set rendering the insertion of the tool into the bores complicated and difficult.

SUMMARY OF THE INVENTION

An object of the invention is to develop a generic tool for machining bores in a workpiece that can be moved straightforwardly into the workpiece.

Still another object is to provide a method for machining bores in a workpiece in which a bore machining tool is moved straightforwardly into the workpiece. According to the invention, these objects are achieved, in the case of the generic tool, by the defining features of claim 1 and, according to the invention, in the case of the generic method this object is achieved by the defining features of claim 44 or 49 by a tool moved into a workpiece eccentrically in relation to an axis of the bores to be machined. Because of this eccentric position, the tool can be moved into the bores without problems. As soon as cutters of the tool are located directly in front of the bores to be machined, the tool is adjusted from its eccentric position into its central position by means of a lifting element in such a manner an axis of the tool coincides with the axis of the workpiece bores. The machining of the bores can then be effected with the cutters of the tool, which is driven rotationally while being displaced axially after the tool has assumed the central position.

In accordance with a method of the invention, the tool is moved eccentrically into the bores and then adjusted into its central position in which the tool's axis coincides with a machine axis. Only then a lifting element is adjusted such that the tool is supported during the machining after the central position.

BRIEF DESCRIPTION OF THE DRAWINGS

The above and other features, objects and advantages will become more readily apparent from a detailed description of the preferred embodiment accompanied by the following drawings, in which:

FIG. 3 shows a view of a tool similar to the view of the tool shown in FIG. 1 but with the tool displaced in a central position in relation to the guide bearings and the workpiece bores to be machined, FIG. 4 shows an end view of a tool seen in the direction of the arrow x in FIG. 3.

DETAILED DESCRIPTION OF THE DRAWINGS

Figure 1:
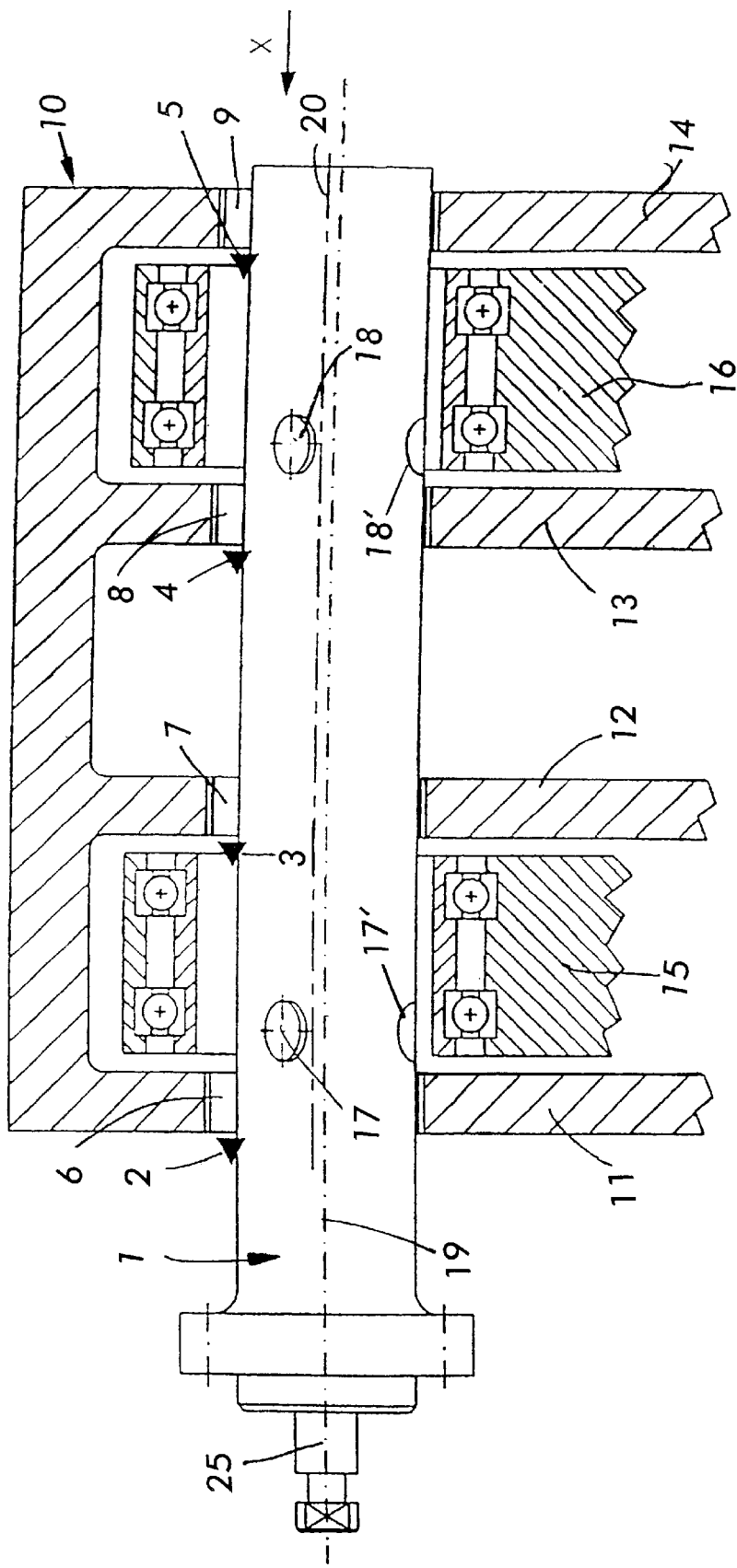
FIG. 1 shows, partly in elevation and partly in section, a tool according to the invention designed as a boring bar, which as been introduced into a workpiece to be machined and arranged eccentrically in relation to guide bearings and workpiece bores to be machined.

Using a tool described below, a number of bores are machined at the same time. It has a base body 1, which carries cutters 2 to 5 distributed over its length. Using the cutters, coaxially located bores 6 to 9 in a workpiece 10 are machined at the same time. The bores 6 to 9 are provided in webs 11 to 14 of the workpiece 10 which are located at a distanced from one another. In each case guide bearings 15 and 16 are introduced into the regions between the webs 11 and 12 and 13 and 14. A diameter of the guide bearings 15, 16 is greater than a diameter of the bores 6 to 9 to be machined. As a result, following operations, such as honing, can be carried out without reclamping.

The base body 1 of the tool is cylindrical and is connected to a working spindle (not illustrated), with which the tool is driven in rotation about its axis 1a in order to machine the bores 6 to 9.

Figure 2:
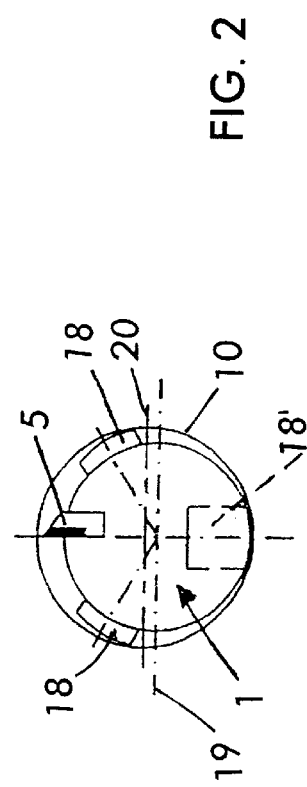
FIG. 2 shows an end view taken along an arrow x as shown in FIG. 1.
Figure 5:
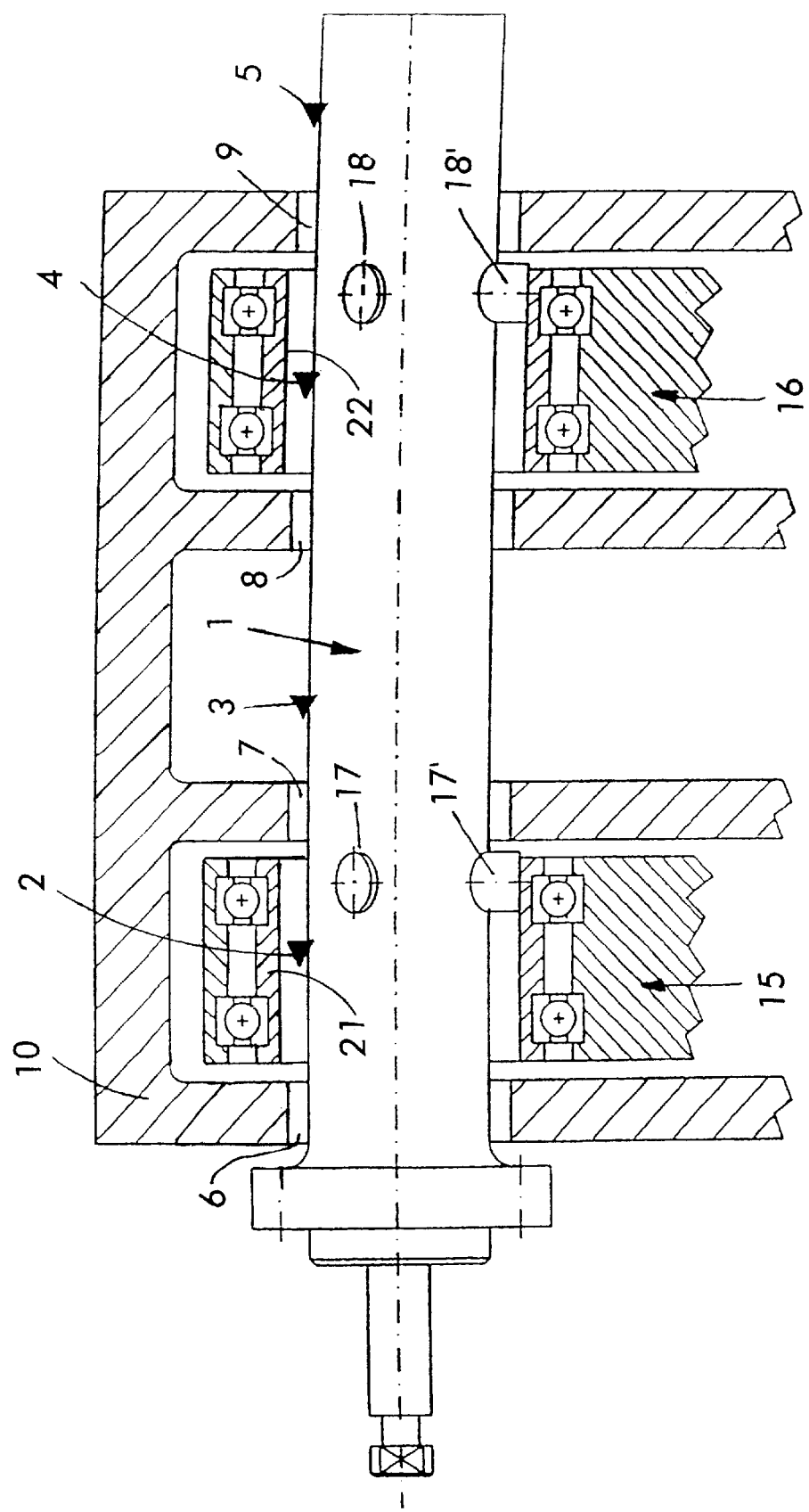
FIG. 5 shows an elevated axial view of a tool according to the invention after the workpiece bores have been machined.

Accommodated in the base body 1 are supporting elements 17, 18. In the exemplary embodiment, in each case three supporting elements 17, and 18 are provided, which are spaced angularly from one another at a uniform distance over the periphery of the base body 1 (FIG. 2). The supporting elements 17 and 18 are located at such a distance from one another that they rest on the guide bearings 15 and 16 during the machining of the workpiece bores 6 to 9 (FIGS. 3 and 5).

Of the three supporting elements 17 and 18, in each case located in a radial plane, one supporting element is arranged to be radially displaceable in the base body 1, while the other two supporting elements 17 and 18 are in each case provided immovably in the base body 1.

In order to machine the workpiece bores 6 to 9, the base body 1 is moved in an eccentric position in which its axis 1a is spaced radially from an axis 20 of the bores 6 to 9 (FIG. 1). Because of the radially offset position, the base body 1 having the cutters 2 to 5 can be moved in without the latter coming into contact with the wall of the bores 6 to 9. The supporting element 17', 18' opposite the cutters 2 to 5 are displaced radially, as is illustrated for the supporting element 18' in FIG. 2. As a result, in this region the base body 1 rests with its outer side on the bore walls. The two other supporting elements 17, 18, which are not provided so as to be radially adjustable in the base body 1, have a clearance from the bore wall when they are moved into the bores, because of the radially offset position of the base body 1 (FIG. 2). The cutters 2 to 5 also have an adequate clearance from the wall of the bores 6 to 9 as a result.

As soon as the tool 1 has been moved into the workpiece 10 (FIG. 3), the tool is moved back radially, so that its axis 19 coincides with the axis 20 of the bores 6 to 9. Offsetting the tool or the base body 1 radially is advantageously achieved by radially moving outward the supporting elements 17', 18', which are supported on the respective guide bearing 15, 16 when moved out. As FIG. 3 shows, when the supporting elements 17', 18' are moved out, the cutters 2 to 5 are still located outside the bores 6 to 9 to be machined by them in each case. The supporting elements 17', 18' therefore form lifting elements.

The guide bearings 15, 16 have an inner ring 21, 22, which is mounted such that it can rotate by means of rolling contact bearings 23, 24.

In order to move the supporting elements 17', 18' out radially, a control rod 25 which is mounted centrally and axially in the base body 1, can be displaced axially with respect to the base body 1 such that it displaces the supporting elements 17', 18' radially in the base body 1. If the control rod 25 is moved into the base body 1 (FIG. 1), the supporting elements 17', 18' are adjusted radially inward. If the control rod 25 is moved out (FIG. 3), the supporting elements 17', 18' are moved out radially.

As soon as the base body 1 has been centered in the inner rings 21, 22 of the guide bearings 15, 16 (FIG. 3), the tool is driven in rotation and displaced axially. In the process, the cutters 2 to 5 machine the bores 6 to 9. During the axial advance, the base body 1 is supported by the supporting elements 17, 17' and 18, 18' on the inner wall of the inner rings 21, 22 of the guide bearings 15, 16.

The guide bearings 15, 16 are sufficiently wide that the supporting elements 17, 17', 18, 18' are supported on the inner rings 21, 22 of the guide bearings 15, 16 as long as the cutters 2 to 5 are machining the bores 6 to 9 over the axial dimension of the latter. FIG. 5 shows the end position of the tool and of its base body 1 when the workpiece 10 has been finally machined. The cutters 2 to 5 are now located outside the bores 6 to 9, while the supporting elements 17, 17', 17, 18' are located on that end of the guide bearings 15, 16 which is at the rear in the advance direction.

Figure 13:
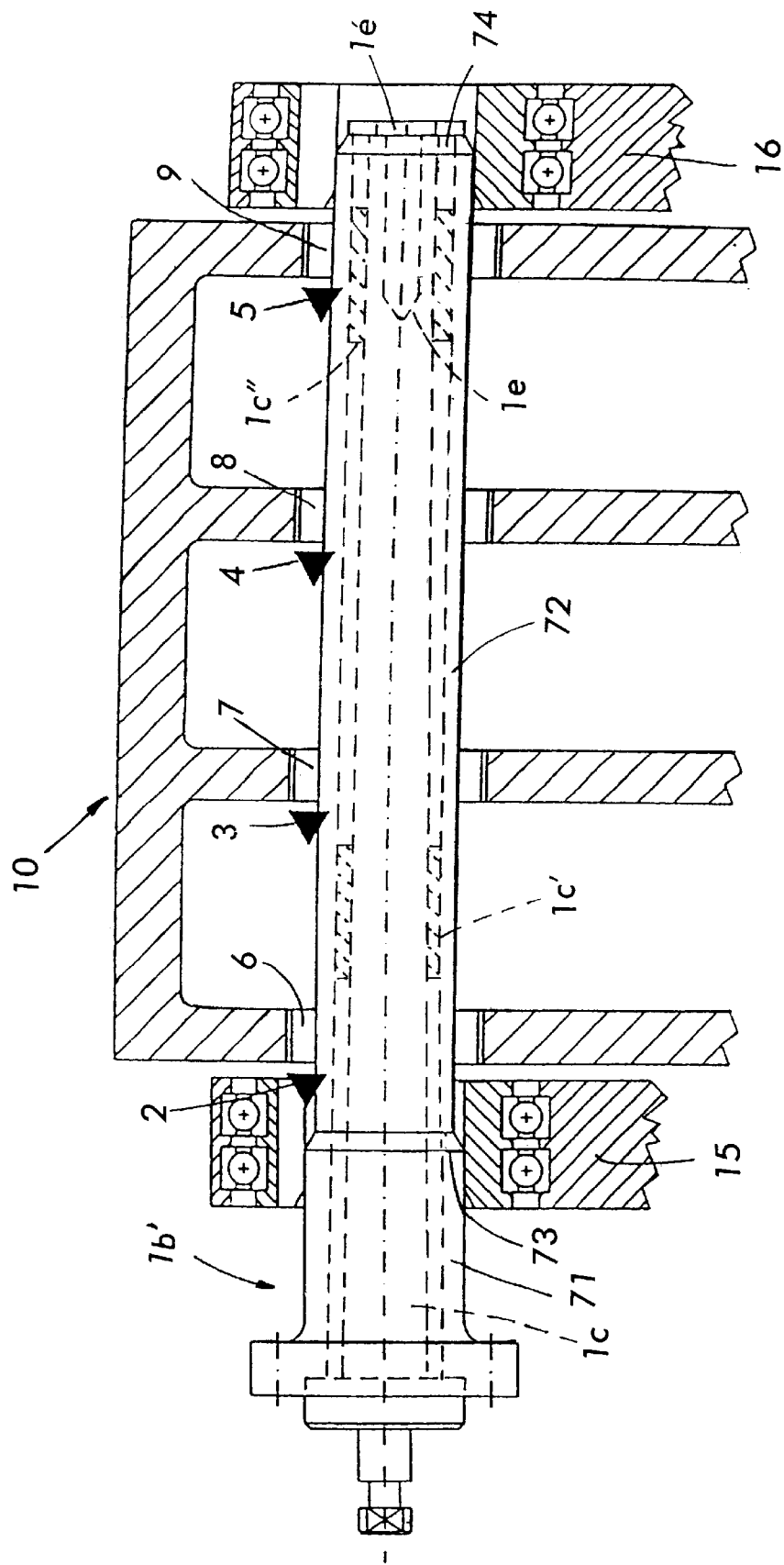
FIG. 13 shows another embodiment of a tool according to the present invention, with the tool displaced further into the workpiece.

The same process is also possible in the case of guide bearings 15, 16 which are located outside the workpiece instead of inside the workpiece 10, as shown by way of example in FIG. 13. This is possible, for example, in the case of the multispindle machining, if other tools are guided in a fixed manner.

The adjustment of the supporting element 17' will be explained in more detail with reference to FIGS. 6 and 7. The other supporting element 18' is adjusted radially in a correspondingly similar manner. The stationary supporting elements 17 project beyond the periphery of the base body 1 and, during the machining of the bores 6 to 9, rest on the inner ring 21 of the guide bearing 15 (FIGS. 3 and 5). The outer sides 26 of the supporting elements 17, 17' are located coaxially with the base body 1 (FIG. 6), so that in the working position (FIGS. 3 and 5) of the tool, the supporting elements rest with their outer sides 26 flush on the inner ring 21 of the guide bearing 15.

Figure 6:
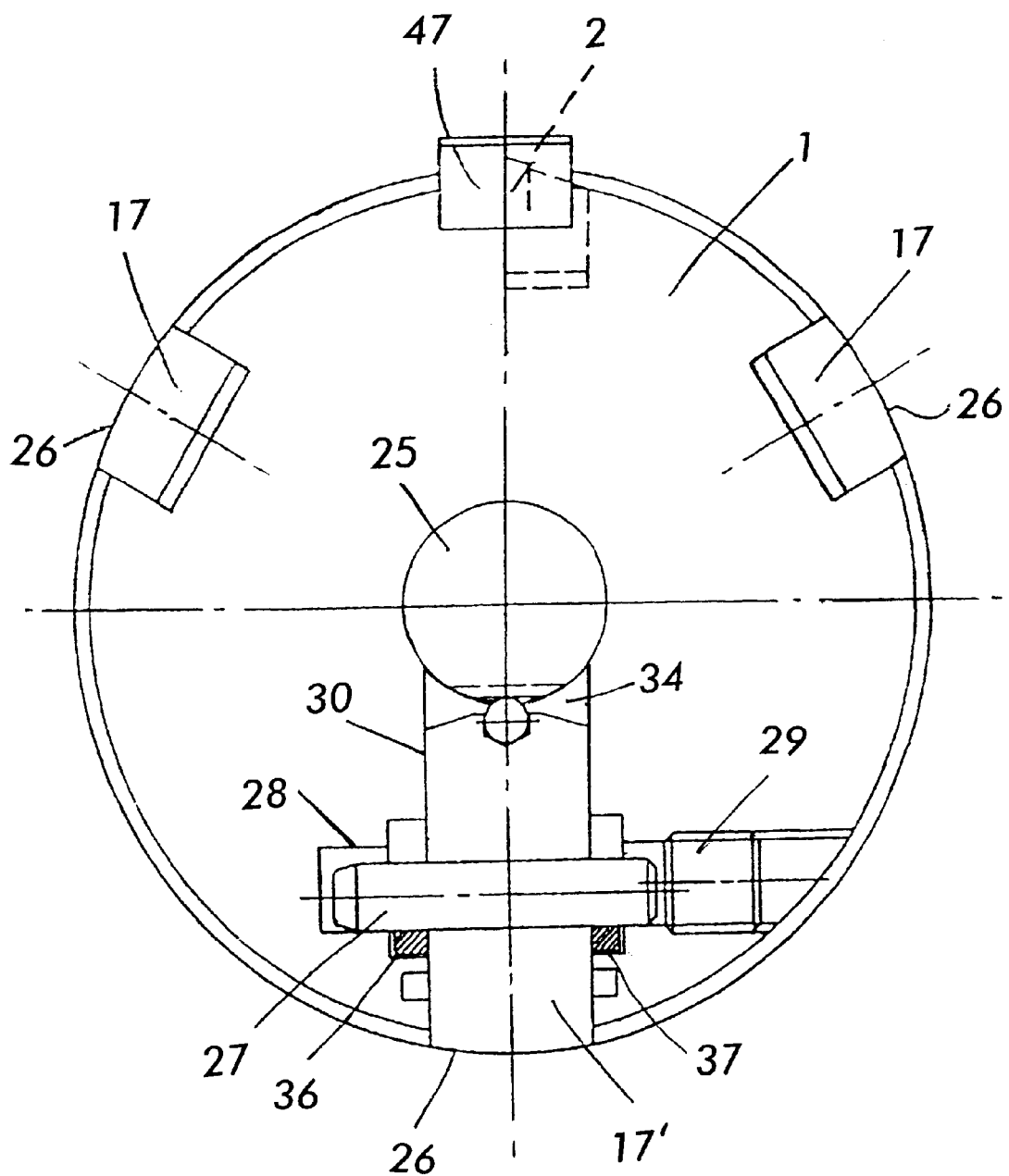
FIG. 6 shows a schematic cross-sectional view of a tool according to FIGS. 1 to 5.

The radially adjustable supporting element 17' is penetrated by a shaft 27 which projects with its two ends into a transverse bore 28 in the base body 1 (FIG. 6). The transverse bore 28 is closed by a stud 29 arranged to be countersunk in the base body 1. The supporting element 17', which is preferably designed as a round pin, is guided in a radial bore 34 in the base body 1. The transverse bore 28 penetrates side walls 32 of the radial bore 34. A restoring spring 35 (FIG. 7), which loads the supporting element 17' radially inward, acts on that side of the shaft 27 facing away from the control rod 25. The restoring spring 35 is designed as a leaf spring and has a recess in the region of the supporting element 17', so that the supporting element 17' is enclosed by two spring legs 36, 37 (FIG. 6). The free ends of the spring legs 36, 37 are bent upward slightly (as FIG. 7 shows), so that they rest flush on the shaft 27 of the supporting element 17'. The restoring spring 35 is accommodated in a fitting space 38, which extends parallel to the axis 1a of the base body 1 and is provided in the region between the control rod 25 and the outer side of the base body 1. The fitting space 38, which extends axially, is closed by a stud 39. The restoring spring 35 is pressed against the wall of the fitting space 38 by one or two clamping screws 40, 41, which are located at a distance from each other and are screwed radially into the base body 1. The distance of the clamping screw 41 from the supporting element 17' is greater than the distance to the clamping screw 40, so that an adequate spring travel is available in order to exert an adequately high restoring force on the supporting element 17'.

The supporting element 17' is located in a sealed manner in the radial fitting space 34 and has, on its end facing the control rod 25, a ball 42, with which the supporting element 17' rests on a control face 43 of the control rod 25. The control face 43 has a flat face portion 44, which merges in an obtuse angle into an oblique control portion 45 extending radially outward. The latter adjoins a straight face portion 46 which is located radially on the outside and is parallel to the face portion 44. The length of the face portion 46 of the control face 43 depends on the required axial stroke of the control rod 25 when machining a lapped bearing, when the cutters, located on slides, are likewise driven by the control rod 25 in a manner known per se. Here, the supporting element 17' is supported on the straight face portion 46, whose length is determined by the required stroke of the slide for machining the lapped bearing.

Figure 7:
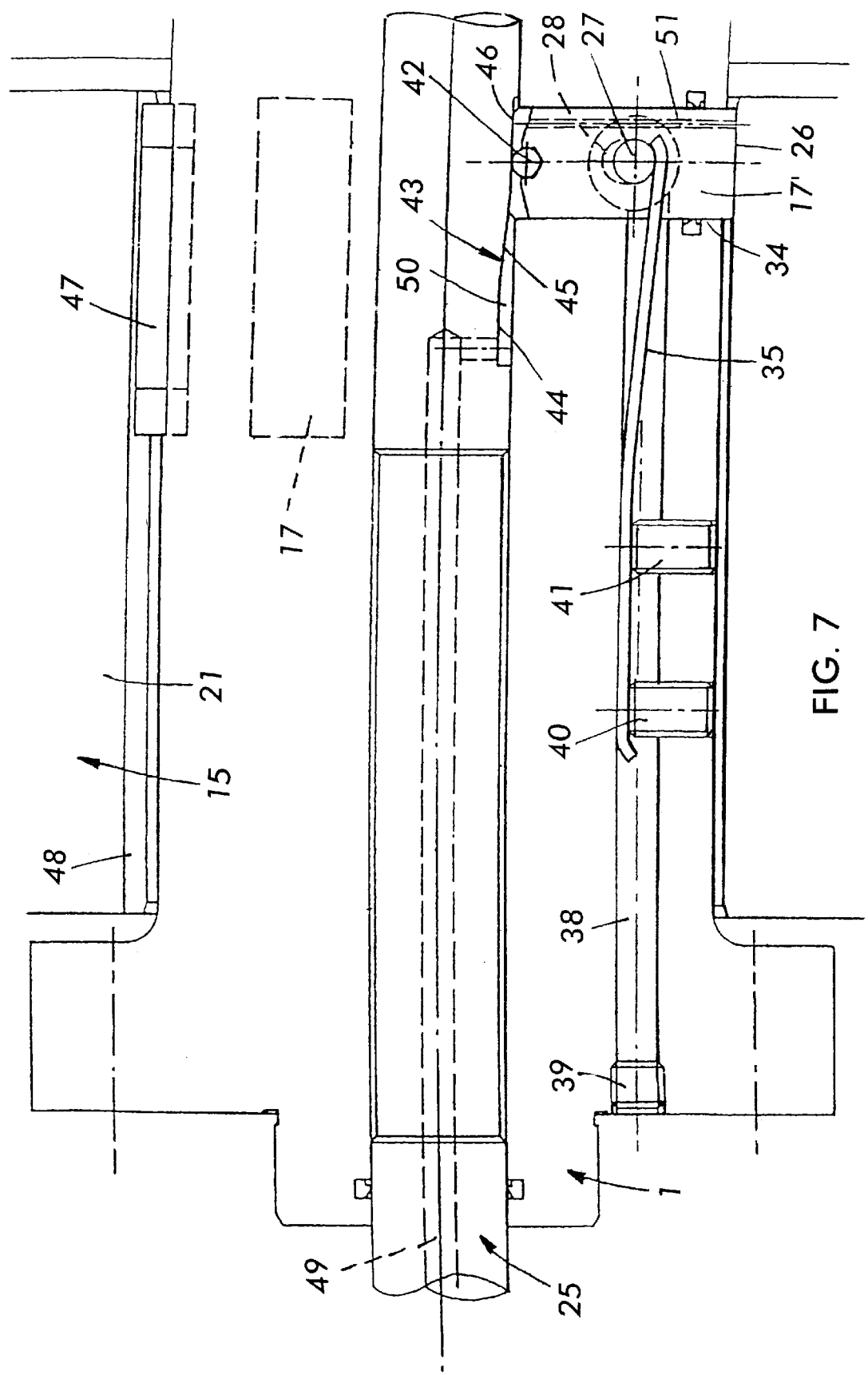
FIG. 7 shows an elevated, partly axially sectional view of a tool according to FIG. 6.

As FIG. 7 reveals, the supporting elements 17 are of rectangular design in axial section in this example. The supporting elements 17 arranged rigidly in the base body 1 are significantly longer in the axial direction of the tool than the radially adjustable supporting element 17', which for this purpose is radially longer than the rigid supporting elements 17.

Provided in the region between the rigid supporting elements 17 is a driver 47, which projects radially beyond the periphery of the base body 1 and engages in an axial groove 48 in the inner wall of the inner ring 21 of the guide bearing 15. In this way, the inner ring 21 of the guide bearing 15 is connected to the base body 1 so as to rotate with it. The groove 48 extends over the entire axial length of the inner ring 21. The driver 47 is significantly shorter and, in the exemplary embodiment, has the same axial length as the rigid supporting elements 17. Of course, the driver 47 can also have a length different from that of the supporting elements 17. As viewed in the axial direction of the base body 1, the driver 47 is located at the level of the cutters 2 to 5.

The control rod has a central compressed-air bore 49, which opens out in the region of the face portion 44 of the control face 43. Formed in the region of the control face 43 is a compressed-air is a compressed-air chamber 50, into which a compressed-air bore 51 in the supporting element 17' opens. The bore extends longitudinally in the supporting element 17' and opens into its outer side 26. Compressed air for blowing the guide face 26 clean can be fed via the above-described compressed-air feed 49, 50, 51.

When the tool is moved into the bores 6 to 9 in the workpiece 10, the control rod 25 is moved axially in relation to the base body 1 (FIG. 1). As a result, the ball 42 of the supporting element 17' comes to rest on the radially inner face portion 44 of the control face 43 under the force of the restoring spring 35. To accommodate the shaft 27, the transverse bore 28 has an oval cross section (FIG. 7), which is chosen such that, when the supporting element 17' is pulled back axially, the shaft 27 rests on that end of the transverse bore 28 which is at the top in FIG. 7. The guide face 26 of the supporting element 17' is then located in the peripheral face of the base body 1, so that the tool can be moved into the workpiece 10 such that it is offset radially in relation to the axis of the bores 6 to 9 (FIG. 1). As soon as the position according to FIG. 1 has been reached, in which the cutters 2 to 5 are located directly in front of the bores 6 to 9 to be machined, the control rod 25 is moved out. In order to do this, actuation of the control rod 25 on the machine side via an additional shaft is required (in the case of simultaneous lapped bearing machining). In this case, the control face 43 is displaced in relation to the supporting element 17 in such a way that the ball 42 passes over the oblique face portion 45 to the straight, radially outer face portion 46 (FIGS. 6 and 7). As a result, the supporting element 17' is adjusted radially outward counter to the force of the restoring spring 35. In so doing, the shaft 27 comes to rest on the radially outer end of the oval transverse bore 28 (FIG. 7). The supporting element 17' is thus prestressed between the control rod 25 and the end of the transverse bore 28, which acts as a stop. The bores 6 to 9 can now be machined simultaneously by the tool, using the cutters 2 to 5.

Instead of actuating the control rod 25 on the machine side via the additional shaft, it is also possible to move the control rod 25 against a stop by means of oil pressure, in order to adjust the supporting element 17' radially.

Figure 8:
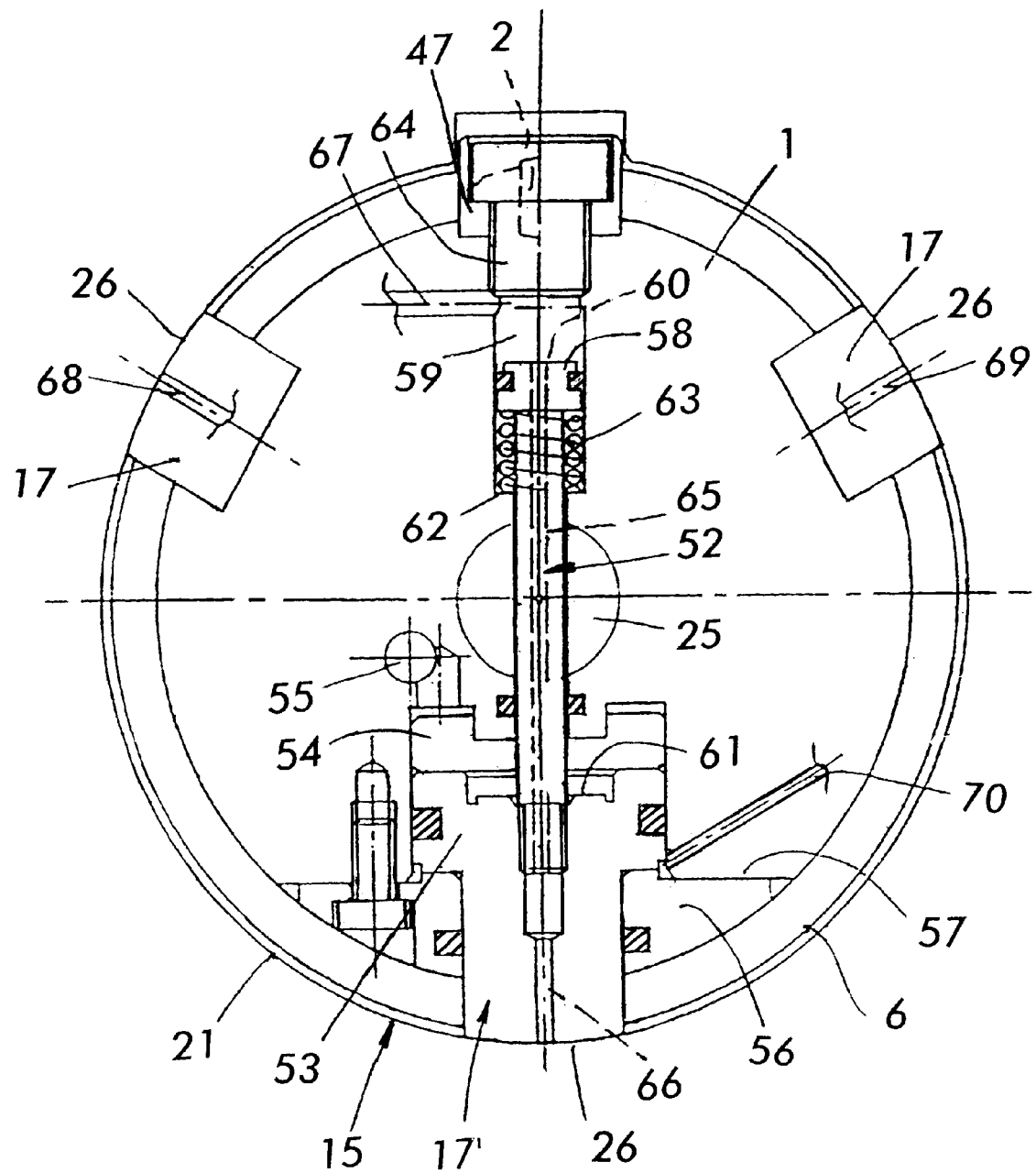
FIG. 8 shows a partly cross-sectional view of a second embodiment of a tool according to the invention.

FIG. 8 shows a further possibility of adjusting the supporting element 17' radially. It is also true for this embodiment that the other radially adjustable supporting element 18' is displaced in the same way. While in the previous embodiment, the control rod 25 has two control faces 43 for the supporting elements 17' and 18', in the present embodiment the radial adjustment of the supporting elements 17', 18' is carried out by a pressure medium. The control rod 25, arranged centrally in the base body 1, has a slot which extends in the axial direction and through which a restoring pin 52 passes radially. The control rod 25 is provided for lapped bearing machining. The restoring pin 52, which is accommodated in the base body 1 such that it can be displaced radially, is screwed into the supporting element 17'. Its radially inner end is designed as a piston 53, which bounds a pressure chamber 54 provided in the base body 1. The piston 53 can be displaced in a sealed manner in the pressure chamber 54, into which a pressure-medium feed 55 opens. The latter extends axially in the base body 1 and, on the machine side, is connected to an appropriate pressure-medium source. In the position illustrated in FIG. 8, the piston 53 rests on a stop 56, which is screwed into a depression on the outer side of the base body 1. The outer side of the stop 56 is shaped in such a way that it rests in the envelope face of the base body 1.

That end of the restoring pin 52 which faces away from the supporting element 17' is designed as a piston 58, which is guided such that it can be displaced in a sealed manner in a pressure chamber 59. That face 60 of the piston 58 to which pressure medium is applied is smaller than that face 61 of the piston 53 to which pressure medium is applied. Accommodated between the piston 58 and a base 62 of the pressure chamber 59 is at least one restoring spring 63, which is designed as a compression spring and which loads the restoring pin 52, and therefore the supporting element 17', radially inward.

The pressure chamber 59 is closed radially outward by a stud 64.

The cutter 2 and the driver 47 for the guide bearing 15 are provided in the region between the two rigid supporting elements 17. They are of identical design as in the previous exemplary embodiment.

The restoring pin 52 is penetrated axially over its entire length by a compressed-air bore 65, which has a flow connection to a compressed-air bore 66 passing radially through the supporting element 17'. A compressed-air bore 67 which is connected to a compressed-air source of the machine, opens into the pressure chamber 59. Further compressed-air bores 68 and 69 advantageously open into the outer sides 26, serving as guide faces, of the rigid supporting elements 17. It is therefore possible, when the supporting elements 17, 17' are resting on the inner ring 21 of the guide bearing 15, for air to be fed in order to blow the guide faces 26 of the supporting elements 17, 17' clean.

In order that the supporting element 17' can be adjusted radially inward again from its radially outwardly adjusted position according to FIG. 8, a further pressure-medium bore 70 opens onto that side of the piston 53 which is opposite the piston face 61.

In the initial position, the supporting element 17' is adjusted radially inward. For this purpose, a pressure medium, preferably a hydraulic medium, is fed via the pressure-medium bore 70. As a result, the piston 53 and therefore the supporting element 17' are adjusted radially inward. This radial movement is further supported by the restoring spring 63, so that the supporting element 17' is reliably moved radially inward, until the face 61 comes to rest on the base body 1. In the process, the hydraulic medium in the pressure chamber 54 is expelled in a known way. In this pulled-back position, the outer side 26 of the supporting element 17' is located in the outer surface of the base body 1. In this position of the supporting element 17', the tool can be inserted in an eccentric position into the workpiece 10 in the manner described (FIG. 1). As soon as the position according to FIG. 3 has been reached, the inward movement of the tool is stopped, and the pressure medium is fed via the pressure-medium feed 55. As a result, the supporting element 17' is displaced radially outward, counter to the force of the restoring spring 63, by the piston 53, until the piston 53 comes to rest on the stop 56 (FIG. 8). In addition, as the supporting element 17' is moved out, compressed air is fed in order to blow the guide faces 26 clean, so that the supporting elements 17, 17' can be placed satisfactorily on the inner ring 21 of the guide bearing 15. During the machining of the workpiece 10, the hydraulic medium is kept under pressure, so that the supporting element 17' maintains its radially extended position. The bores 6 to 9 in the workpiece 10 are now machined simultaneously in the above-described manner, the tool being advanced axially.

Figure 9:
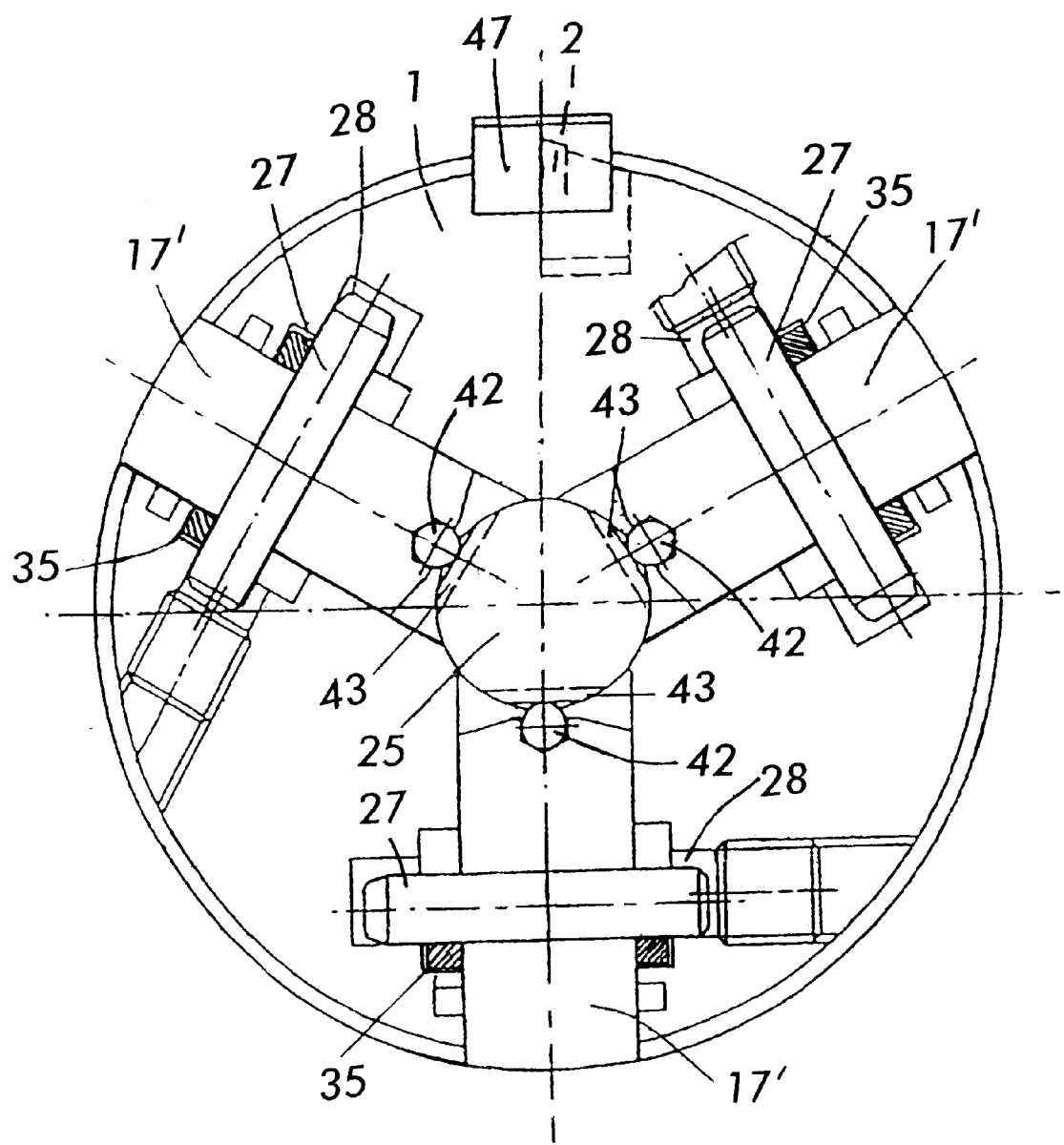
FIG. 9 shows a partly cross sectional view of a third embodiment of a tool according to the invention.

The exemplary embodiment according to FIG. 9 corresponds to the exemplary embodiment according to FIGS. 1 to 8. The single difference is that all the supporting elements 17' are mounted such that they can be adjusted radially in the base body 1. The three supporting elements 17' are in this case of identical design and are each penetrated by a shaft 27, the latter being supported with their ends in transverse bores 28 of the base body 1. The control rod 25 accordingly has three control faces 43, which are designed in the same way as the control face 43 according to FIGS. 6 and 7. The supporting elements 17' each rest with a ball 42 on the control faces 43, as has been explained in detail with reference to FIGS. 6 and 7. The transverse bores 28 each have an oval cross section, so that the shafts 27 rest on the respective end of the transverse bores 28 in the radially inner and in the radially outer position of the supporting elements 17'. Each supporting element 17' is loaded radially inward by a restoring spring 35 in each case, as has been explained with reference to FIGS. 6 and 7.

When the control rod 25 is displaced, all the supporting elements 17' are adjusted radially in the manner described. This embodiment is used when, because of an only low eccentric offset of the base body 1 when it is moved into the workpiece 10, the fixed supporting elements otherwise provided would collide with the respective guide bearing 15, 16 or with the workpiece 10. In order to move the tool into the workpiece 10, all the supporting elements 17' are therefore adjusted radially inward, so that the tool can also be used for workpieces whose bores have a diameter which is only little greater than the external diameter of the base body 1. Even then, the tool can be moved in in a radially eccentrically offset manner through the bores 6 to 9 to be machined in the workpiece 10.

In this case, the other supporting elements 18 of the tool are designed in the same way as the supporting elements 17', that is to say they can also be adjusted radially by means of the control rod 25. The control rod 25 is provided with three corresponding control faces for the radially adjustable supporting elements 18.

Figure 17:
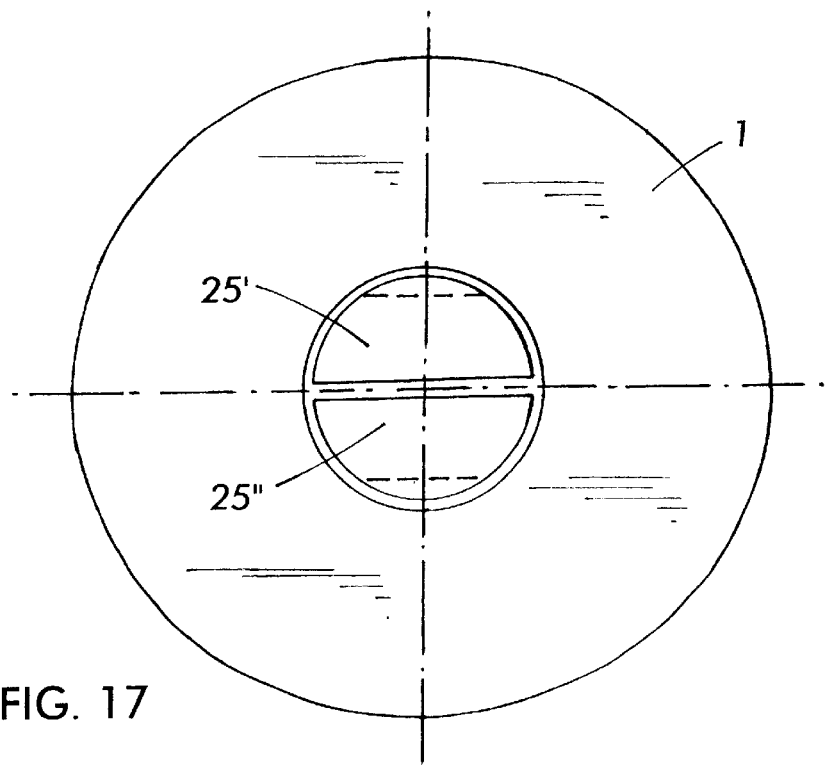
FIGS. 17 and 18 show two further and end schematic views of further embodiments of a tool according to the invention.

FIG. 17 shows an embodiment in which two control rods 25', 25" are mounted such that they can be displaced axially in the base body 1. They each have a semicircular cross section and can be actuated independently of each other.

Figure 18:
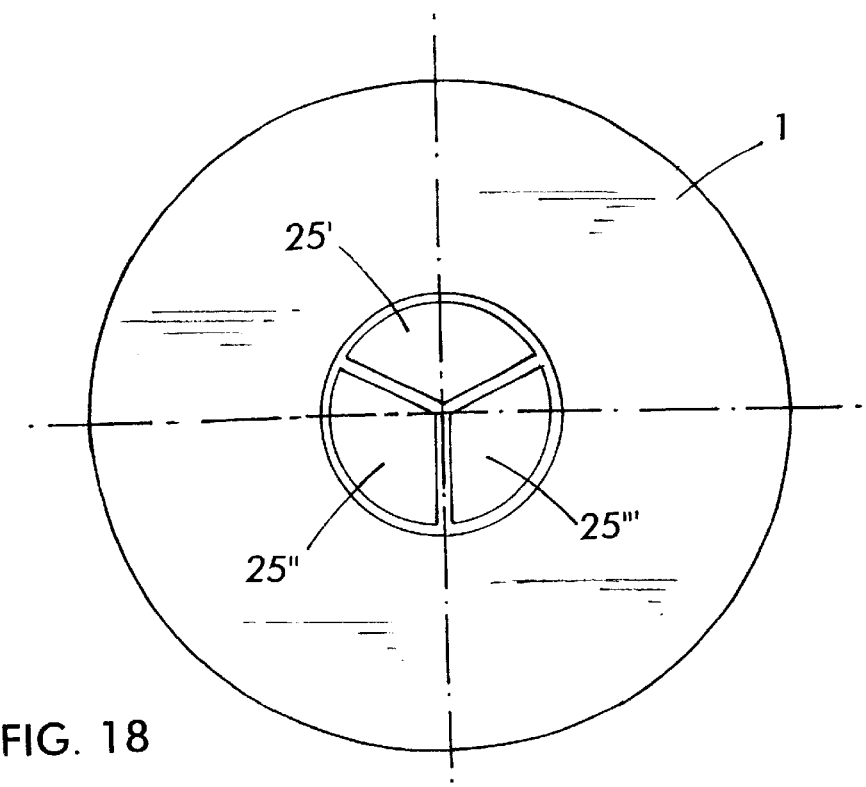

In the exemplary embodiment according to FIG. 18, three control rods 25', 25", 25"' are accommodated in the base body 1, can be adjusted axially independently of one another and each have a sector-like cross section.

The control rods 25', 25", 25'" which can be adjusted independently of one another (FIGS. 17 and 18) can be used for different functions, for example for driving the control elements 17', 18' for the radial readjustment of one or more cutters 2 to 5 or for actuating a measuring element.

Figure 10:
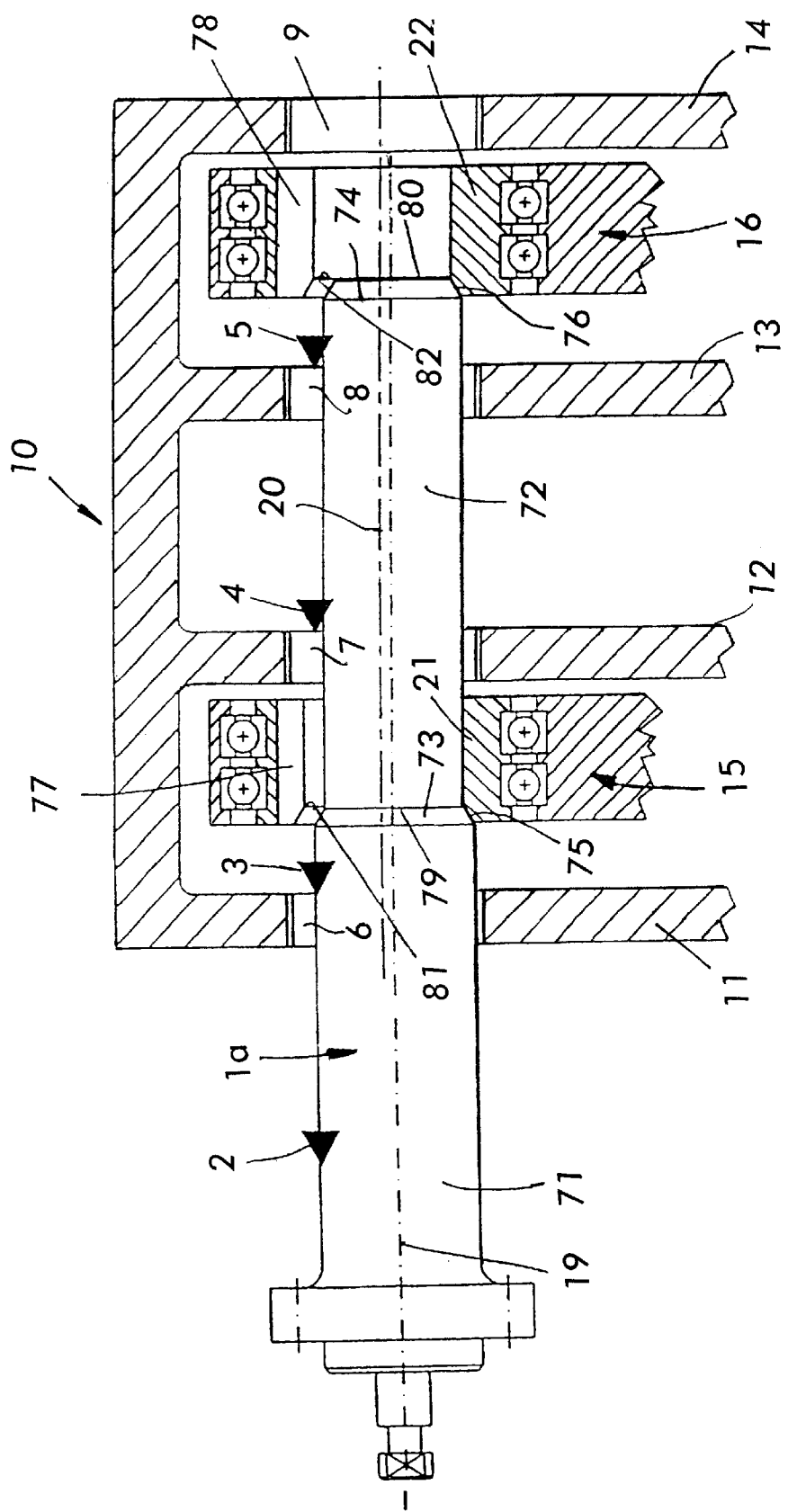
FIG. 10 shows, partly in elevation and partly in axial section, a further embodiment of a tool according to the invention.
Figure 11:
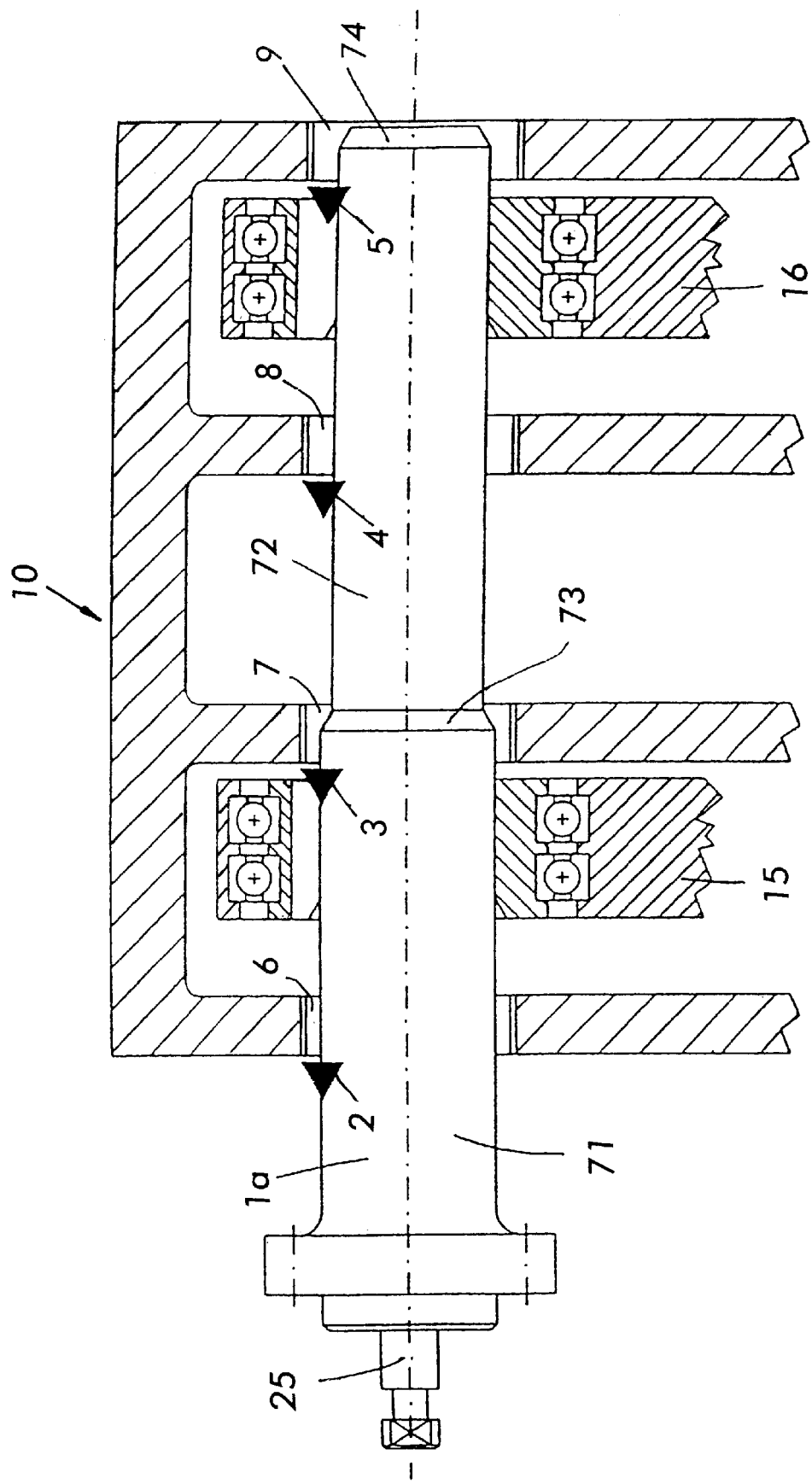
FIG. 11 shows a view similar to FIG. 10 but with a tool displaced further into the workpiece.

FIGS. 10 and 11 show a tool whose base body 1a comprises two sections 71 and 72 with diameters of different sizes. The section 72 of the base body which is at the front in the advance direction of the tool has a smaller diameter than the section 71 of the base body. The transition between the two sections 71 and 72 of the base body is designed as a truncated cone 73. The free end 74 of the base body 1a also has the shape of a truncated cone 74.

As in the exemplary embodiments previously described, the guide bearings 15 and 16 are located between the webs 11, 12 and 13, 14 of the workpiece 10. At the end which is at the rear in the insertion direction of the tool, the inner ring 21, 22 of the guide bearings 15, 16 is provided with a conical chamfer 75, 76 corresponding to the truncated cones 73, 74.

The base body 1a is provided with the cutters 2 to 5 for machining the bores 6 to 9. In contrast to the previous exemplary embodiments, the internal diameter of the guide bearings 15, 16 is smaller than the diameter of the workpiece bores 6 to 9. In order that the cutters 2 to 5 do not collide with the inner ring 21, 22 of the guide bearings 15, 16 as the tool is moved into the workpiece 10, the inner rings 21, 22 are each provided with an axial groove 77, 78, which extends over the axial width of the inner ring and are radially so deep that the cutters of the tool can be moved through them without contact.

Because of the truncated cones 73, 74, two circumferential edges 79 and 80 are formed. In the same way, the chamfers 75, 76 on the narrower end are each provided with a circumferential edge 81 and 82. The distance between the edges 81 and 82 on the guide-bearing side corresponds to the distance between the edges 79 and 80 on the base-body side. This achieves the situation where, when the base body 1a is being moved into the workpiece 10, it is automatically centered with respect to the workpiece bores 6 to 9 to be machined.

As FIG. 10 reveals, the workpiece is inserted into the workpiece 10 in such a way that its axis 19 is located eccentrically in relation to the axis 20 of the bores 6 to 9. Before being moved into the workpiece 10, the tool is aligned in such a way that the cutters 2 to 5, which are located at a distance one behind another in the axial direction, are located at the level of the grooves 77, 78 in the guide bearings 15, 16. As a result, the cutters pass into these grooves as they are inserted into the workpiece 10, so that they cannot be damaged. The tool is inserted until the truncated cone 73 at the transition from the thinner to the thicker section 71, 72 of the base body rests on the chamfer 75 on the guide bearing 15. Since the distance between the edges 79 and 80 of the base body 1a corresponds to the distance between the edges 81, 82 of the guide bearings 15, 16, the truncated cone 74 of the base body 1a also then rests on the chamfer 76 on the guide bearing 16. In this position, the thicker section 71 of the base body has a clearance from the wall of the workpiece bore 6.

If the tool is inserted further into the workpiece 10 from the position according to FIG. 10, the thicker section 71 of the base body comes onto the guide bearing 15 (FIG. 11). It is arranged in such a way that, as viewed in the axial direction of the workpiece bores 6 to 9, its lower region projects into the workpiece bores. The tool is therefore necessarily lifted during the further insertion and, as a result, is automatically centered in the workpiece bores. The section 71 of the base body then rests on the guide bearing 15 (FIG. 11). The other guide bearing 16 is arranged in such a way that it projects further radially into the workpiece bores 6 to 9, as viewed in their axial direction, than the guide bearing 15. This projection is selected such that the base body 1a rests with its thinner section 72 of the base body on the guide bearing 16. In this position, the sections 71, 72 of the base body have a clearance from the walls of the workpiece bores 6 to 9.

In order that the required eccentric movement of the workpiece can be effected, the drive spindle (not illustrated) is provided with a swinging tool holder, which permits the necessary displacement of the tool. The tool is moved into the workpiece 10 until the cutters 2 to 5 are located directly in front of the workpiece bores 6 to 9 to be machined (FIG. 11). The rotary drive of the spindle is then switched on, and the rotating tool is moved further into the workpiece 10 from the position according to FIG. 11. In so doing, the cutters 2 to 5 machine the bores 6 to 9 simultaneously. The sections 71, 72 of the base body are sufficiently long that they rest on the guide bearings 15, 16 during the machining of the bores 6 to 9 and, as a result, ensure the central alignment of the tool in relation to the workpiece bores 6 to 9.

A tool design of this type is used, for example, when reclamping is permitted during precision machining, in particular during honing. In the above exemplary embodiments having the radially adjustable supporting elements 17', 18', reclamping during honing is not necessary.

The control rod 25 provided centrally in the base body 1a is used, as is known per se, for machining annular stop faces on the workpiece webs 11 to 14 of the lapped bearing.

Figure 12:
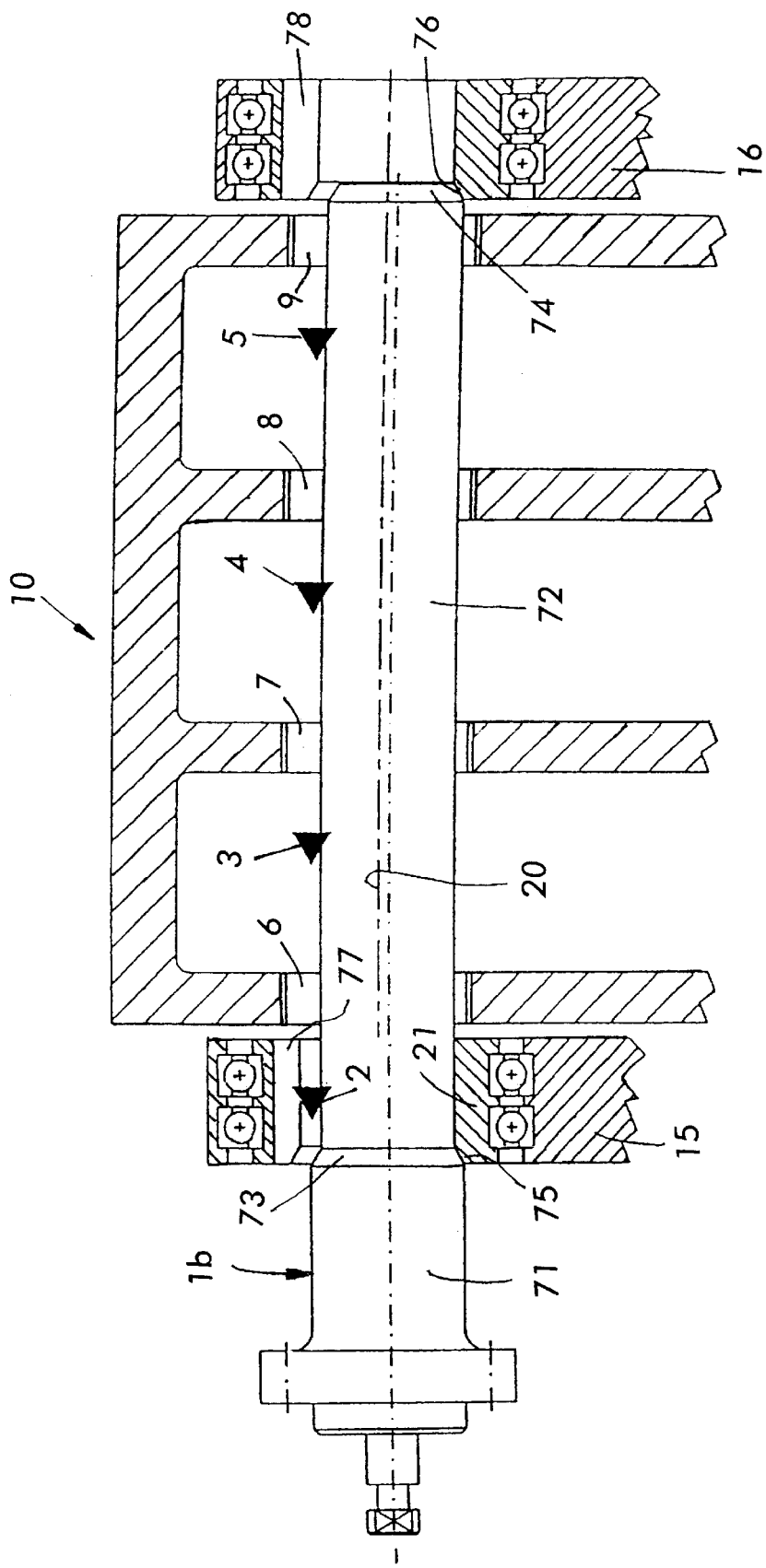
FIG. 12 shows an axial view of a tool according to the invention which is supported during the machining of the workpiece by guide bearings located on the outside.

The exemplary embodiment according to FIGS. 12 and 13 differs from the previous exemplary embodiment only in the fact that the two guide bearings 15 and 16 are arranged on either side of the workpiece 10 to be machined. Since they are at a greater distance from one another than in the previous embodiment, the sections 71, 72 of the base body 1b have a different length as compared with the previous embodiment. Otherwise, the tool is moved eccentrically into the workpiece 10 in the same way as in the previous exemplary embodiment. As FIG. 12 reveals, the tool is moved into the workpiece 10 until the two truncated cones 73, 74 of the base body 1b rest on the truncated cone-like chamfers 75 and 76 on the guide bearings 15, 16. In this case, the thinner section 72 of the base body rests on the inner ring 21 of the guide bearing 15. As in the previous exemplary embodiment, the two guide bearings 15, 16 have an internal diameter which is greater than the diameter of the thinner section 72 of the base body. Since the two guide bearings 15, 16 are arranged outside the workpiece 10, the thinner section 72 of the base body is sufficiently long that it passes through all the workpiece bores 6 to 9 to be machined. When it is being moved into the position according to FIG. 12, the base body 1b is supported with the section 72 of the base body on the guide bearing 15. In a way which corresponds with the previous exemplary embodiment, it is arranged in relation to the workpiece bores 6 to 9 such that the section 72 of the base body has a clearance from the walls of the bores 6 to 9. During the insertion, the base body 1b is again aligned in the direction of rotation such that the cutters 2 to 5 pass into the grooves 77, 78 in the inner rings 21, 22 of the guide bearings 15, 16. Because of the eccentric position of the base body 1b in relation to the axis 20 of the bores, the cutters 2 to 5 do not come in contact with the wall of the bores as they move into the workpiece 10.

Once the position according to FIG. 12 has been reached, in which the truncated cones 73, 74 of the base body 1b rest on the chamfers 75, 76 on the guide bearings 15, 16, the tool is automatically centered in the workpiece bores 6 to 9 as it is moved in further. The base body 1b is lifted by the truncated cones 73, 74 in a way corresponding to the previous embodiment. As described with reference to the previous embodiment, the base body 1b is then held with its portions 71, 72 in the guide bearings 15, 16. Once the position according to FIG. 13 has been reached, in which the cutters 2 to 5 are located directly in front of the workpiece bores 6 to 9, the rotary drive of the spindle is switched on, and the rotating tool is now moved into the workpiece 10. In the process, the cutters 2 to 5 machine the workpiece bores 6 to 9.

The truncated cones 73, 74 serving as lifting elements can be a constituent part of a rotation sleeve 1b', illustrated in FIG. 13 as mounted on a central base body 1c, shown in phantom, such that it can rotate relative to the control base body 1c, but cannot be displaced axially. For example, bearings 1c' and 1c'', shown in a cross-sectional phantom view, support the rotation sleeve 1b' on the central base body 1c to permit relative rotational movement. A securing element 1e, such as a threaded bolt cooperating with a threaded opening, can be fixed in the central base body 1c to maintain a certain axial relationship between the rotation sleeve 1b' and the central base body 1c. The securing element 1e has a head portion 1e' that is dimensioned to abut with the rotation sleeve 1b'. The rotation sleeve 1b' is supported in the respective guide bearing 15, 16, when the composite assembly of the rotation sleeve 1b' and the central base body 1c has been displaced from the insertion position into the central machining position.

In all the exemplary embodiments described, the tool is withdrawn from the workpiece 10 in the converse sequence.

Figure 14:
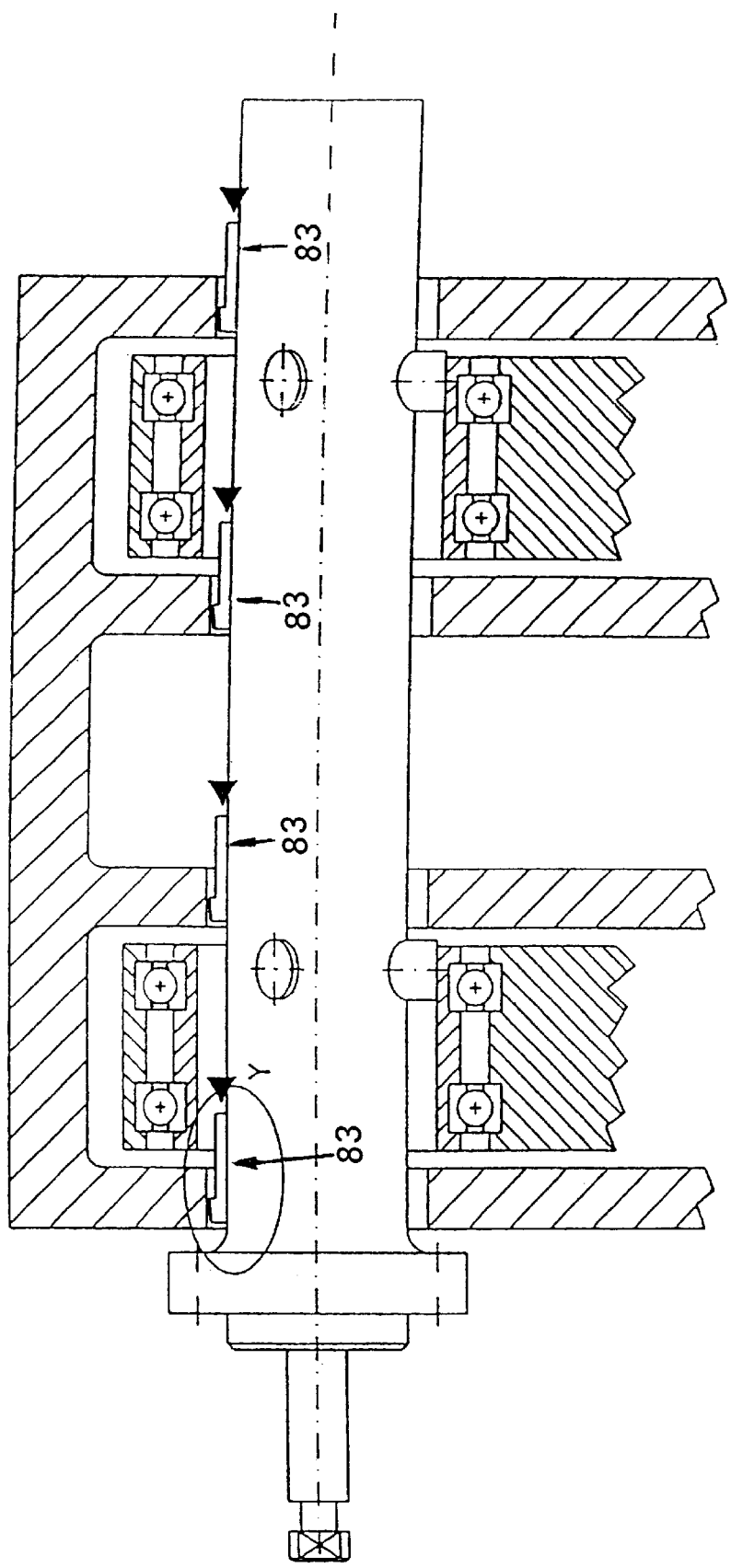
FIG. 14 shows an elevated, axial view of a tool according to still another embodiment of the invention.
Figure 15:
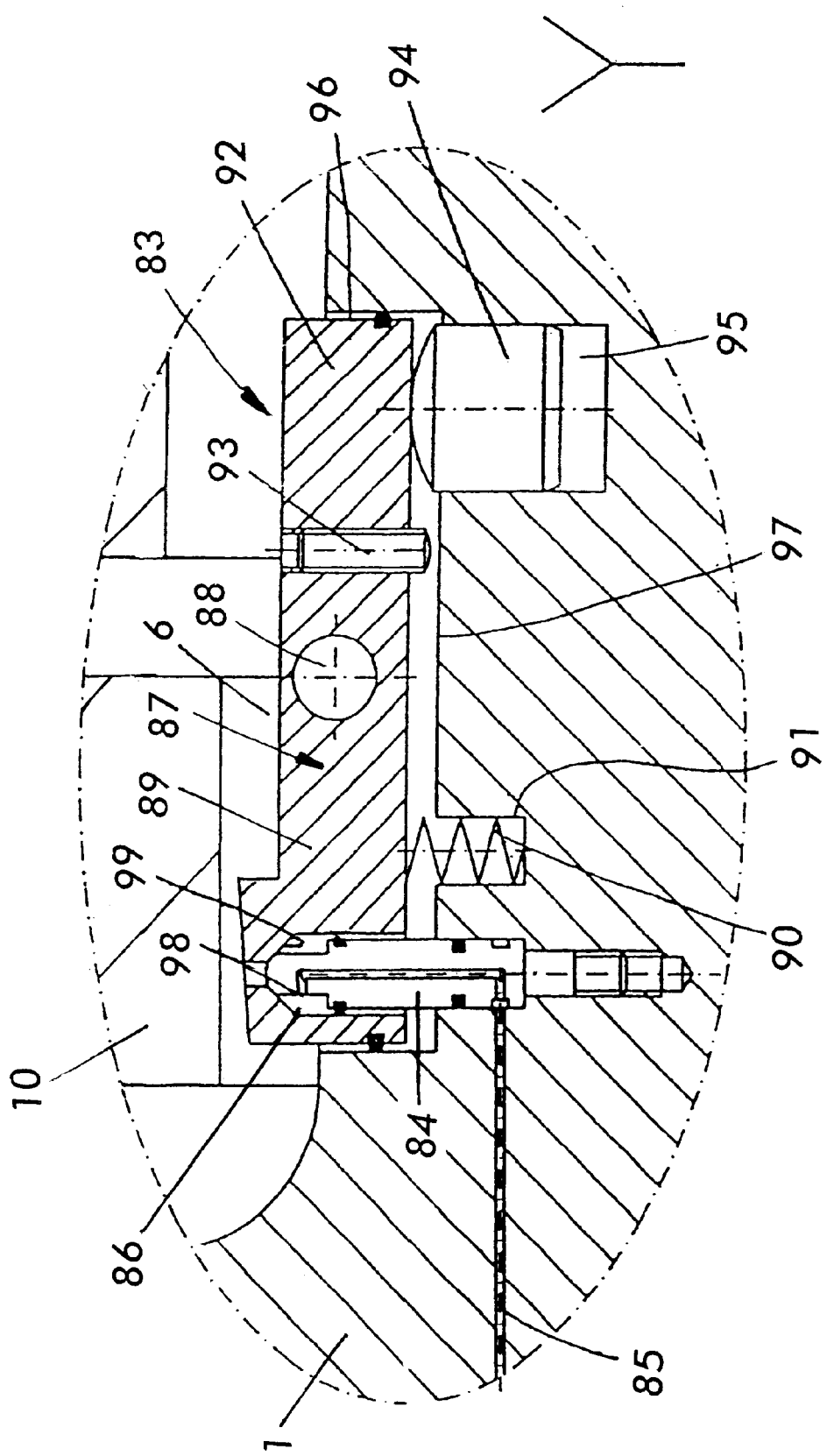
FIG. 15 shows a sectional view of detail Y in FIG. 14 in an enlarged illustration and in an inoperative position.
Figure 16:
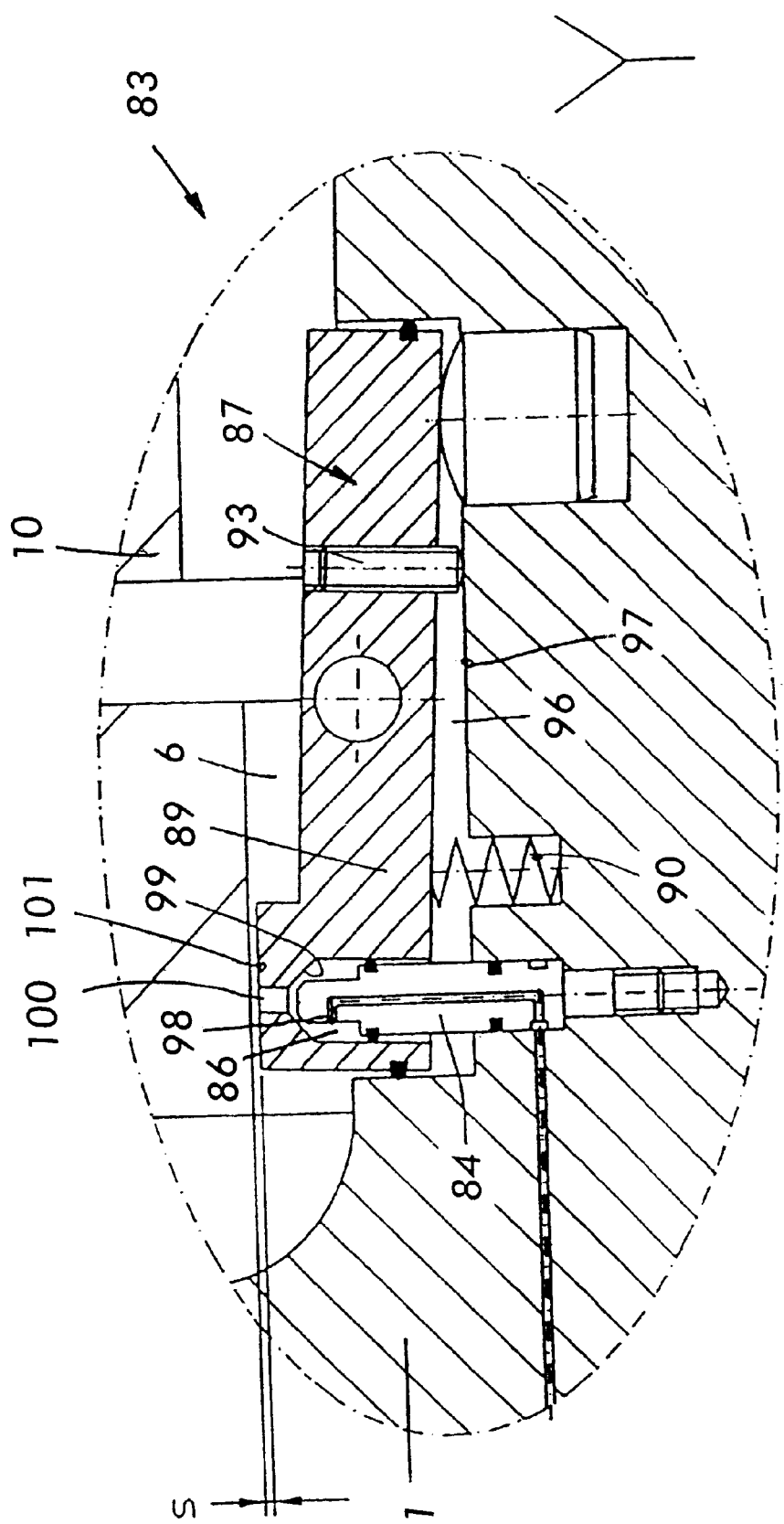
FIG. 16 shows a view similar to one of FIG. 15 but with the detail Y which is illustrated in a measuring position.

FIGS. 14 to 16 show a tool which is provided with measuring devices 83, with which the diameter of the bores 6 to 9 can be measured simply and nevertheless very accurately immediately after the machining. The tool has the same number of measuring devices as the number of bores machined in the workpiece 10. The measuring devices 83 are of identical design and will be explained in detail with reference to FIGS. 15 and 16.

The measuring device 83 works on the compressed-air principle and is arranged on the base body 1 of the tool. During the metal-removing machining, the measuring device 83 is uncoupled and, as FIG. 15 shows, is arranged such that a measuring nozzle 84 of the measuring device 83 cannot come into contact with the wall of the bore in the workpiece 10. The measuring nozzle 84 is arranged fixed on the base body 1 of the tool. A compressed-air line 85, which is provided in the base body 1 and is connected to a compressed-air source, opens into said measuring nozzle 84. The measuring nozzle 84 projects into a mounting space 86 of a two-armed rocker 87. It can be pivoted about an axis 88 which is located perpendicular to the axis of the tool and close to the periphery of the base body 1. Supported on the arm 89 having the mounting space 86 is a compressing spring 90, which is provided in a depression 91 in the outer side of the base body 1. The other rocker arm 92 has a setting screw 93, which is designed as a threaded pin and with which the pivoting travel of the rocker 87 for the measuring operation can be set. In the region of its free end, the rocker arm 92 rests on a centrifugal force element 94, which is mounted such that it can be displaced radially in a depression 95 in the outer side of the base body 1. The rocker 87 projects partially into a depression 96 which is provided on the outer side of the base body 1 and into whose base 97 the depressions 91 and 95 open.

During the machining of the workpiece 10 or its bores 6 to 9, the tool rotates at the speed $N_{Work}$. The centrifugal force element 94 is designed and arranged on the base body 1 in such a way that it moves radially outward under centrifugal force and, in so doing, pivots the rocker 87 counter to the force of the compression spring 90 (FIG. 15). An outlet opening 98 for the compressed air is located at the side on the measuring nozzle 86. During the machining of the workpiece, a base 99 of the mounting space 86 rests over the periphery of the measuring nozzle 84, on the end region of the latter. As a result, the nozzle output opening 98 is closed, so that any dirt arising during the machining of the workpiece does not get into the nozzles 98 and block the latter.

During the machining of the workpiece, no measurement takes place. The rocker 87 is located with a sufficient clearance from the wall of the bores 6 to 9, so that damage by the rocker is avoided.

After the machining of the workpiece, the drive spindle and therefore the tool are stopped. Since centrifugal force no longer acts on the centrifugal element 94, the rocker 87 is pivoted into the position illustrated in FIG. 16, under the force of the compression spring 90. The pivoting angle is determined by the projection of the setting screw 93 beyond the rocker 87. The setting screw 93 comes to rest on the base 97 of the depression 96, and thereby terminates the pivoting movement of the rocker 87. Because of the pivoting movement of the rocker 87, the base 99 of the mounting space 86 is lifted off the measuring nozzle 84. The compressed air can therefore flow out of the outlet opening 98 of the measuring nozzle 84 toward an outlet opening 100, directed toward the wall of the bore 6 to 9, in the rocker arm 89. In the region of the measuring nozzle 84, the rocker arm 89 is of thickened design. The end 101 of the rocker arm 89 which is directed toward the wall of the bore 6 to 9 forms a measuring face, which is located opposite the wall of the bore with a measuring gap s (FIG. 16). The size of this measuring gap s can be set finely and continuously using the setting screw 93. The finished bore is therefore measured by the compressed air. The evaluation of the measurement result is known per se and will therefore not be explained in more detail.

On the machine side, the compressed air is connected in a manner known per se to the stationary tool following the machining of the workpiece 10. One measuring nozzle 84 is sufficient to measure the finished bore. It is of course possible to provide a number of measuring nozzles 84 for each bore 6 to 9, which are provided over the periphery of the tool and are designed in the same way as has been explained with reference to FIGS. 14 to 16. The measuring nozzles 84 one behind another, in each case in relation to one bore.

The nozzles can also be provided as simple outlet openings at a precise diameter of the tool or on a rocker controlled by the control rod 25. The rocker is controlled via an oblique face on the control rod 25, similar to the control of the supporting elements. Finally, it is possible not only to perform the measurement of the finished bore 6 to 9 via the air gap s but also to perform it via direct contact between the measuring device 83 and the workpiece 10. In this case, the measuring device 83 is of course designed in such a way that it does not damage the wall of the bore.

The centrifugal force-controlled rocker 87 has a number of functions. During the machining of the workpiece 10, it closes the measuring nozzle 84, so that dirt, coolant and the like cannot get to the measuring nozzle. Furthermore, when the tool is stationary, it lifts off from the measuring nozzle 84 automatically, so that the measuring operation by means of the compressed air can be carried out immediately afterward. Although the measuring face 101 comes into contact with the wall of the bore, for example in the case of a cutter fracture, it is not damaged, since the tool is stationary during the measuring operation.

The air-measuring nozzles 84 operate so accurately that a measurement of the diameter in the $\mu$ range is possible. Since the air-measuring nozzles 84 are integrated into the tool, a separate measuring mandrel is not necessary, so that the idle times during the use of the tool are shortened. In addition, a significantly more precise measurement results than that using a separate measuring mandrel, since the air-measuring nozzles 84 are arranged directly on the machining tool and positioning errors are therefore avoided.

The measuring devices 83 described can be used in all the previously described embodiments of tools.

The measuring nozzle 84 can also be provided in a rocker which is controlled mechanically by the control rod 25. The rocker is pivoted into the respective position by displacing the control rod 25. The measurement is then carried out in the same way as has been explained with reference to FIGS. 14 to 16.

The adjustment of the tool from the eccentric position into the central position can also be carried out by an appropriate movement of the machine axis. The lifting or supporting elements 17, 18, 17', 18', 73, 74 then hold the tool in the central position during the machining. In this case, too, the workpiece 10 is not adjusted, only the tool.

What is claimed is:

1. A tool for machining bores which are centered on a bore axis extending along a workpiece, a tool having:
   a base body having a tool axis and insertable in the workpiece in an eccentric insertion position such that the tool axis is radially offset from the bore axis during subsequent axial displacement of the base body toward a predetermined axial position;
   a plurality of axially spaced apart cutters projecting from the base body for machining the bores in the workpiece;
   the base body having at least one integrated lifting element displaceable axially with the base body to the predetermined axial position in which the at least one integrated lifting element acts upon the base body so that the base body can be moved from the eccentric insertion position into a central machining position, in which the tool axis coincides with the bore axis of the bores, whereby relative rotation of the tool and the workpiece in the central machining position causes the cutters to machine the bores.

2. A tool for machining bores which are centered on a bore axis extending along a workpiece, the tool having:
   a base body having a tool axis and insertable in the workpiece in an eccentric insertion position such that the tool axis is radially offset from the bore axis during subsequent axial displacement of the base body toward a predetermined axial position;
   cutters mounted on the base body for machining the bores in the workpiece;
   a lifting element mounted in the base body and adjustable radially so as to enable the base body to move from the eccentric insertion position into a central machining position, in which the tool axis of the base body coincides with the bore axis.

3. The tool as claimed in claim 2, further comprising an adjuster for radially adjusting the lifting element, the lifting element being mounted on the base body such that it is spaced from at least one of the cutters along a line normal to the tool axis, whereby the cutters are spaced at a radial distance from bore surface in the eccentric position of the base body and are displaced toward the bore surface as the base body is moved in the central machining position after the lifting element has been adjusted.

4. The tool as claimed in claim 2, wherein the lifting element can be adjusted by means of a pressure medium.

5. The tool as claimed in claim 2, further comprising a restoring element which presses against the lifting element with a force sufficient to displace the lifting element in an inner radial position corresponding to the insertion eccentric position of the base body, the lifting element being displaceable into an outer radial position after overcoming the force exerted by the restoring element in the predetermined axial position of the base body.

6. The tool as claimed in claim 5, wherein the lifting element can be adjusted radially by a control rod.

7. The tool as claimed in claim 6, wherein the control rod is mounted in the base body such that it can be displaced axially parallel to the tool axis.

8. The tool as claimed in claim 6, wherein the control rod has a control face having a straight outer radial portion, the base body having a bore which extends transversely to the tool axis and is traversed by the lifting element, the tool further comprising a shaft extending along the bore and being acted upon by the restoring element with the force biasing the lifting element toward the inner radial position as the base body is displaceable to the predetermined axial position in which the outer radial portion of the control rod presses against the lifting element with a counter force sufficient to displace the lifting element in the outer radial position corresponding to the central machining position of the base body.

9. The tool as claimed in claim 8 wherein the at least one lifting element has a ball resting on the control face as the control rod moves relative to the base body.

10. The tool as claimed in claim 8, wherein the control face has a straight, inner control face portion, which is spaced axially and radially inward from the straight outer portion, and an inclined face portion connecting the straight outer and inner control face portions.

11. A tool for machining bores which are centered on a bore axis extending along a workpiece, the tool comprising:

a base body having a tool axis and insertable in the workpiece in an eccentric position in which the tool axis is radially offset from the bore axis;

a compressed air supply line extending the base body for delivering compressed air;

cutters mounted on the base body for machining the bores;

a lifting element with which the base body can be moved from the eccentric position into a central machining position, in which the tool axis coincides with the bore axis, the lifting element having an outer side, which is spaced radially outwardly from the tool axis, and at least one compressed-air bore which extends through the lifting element toward and opens into the outer side of the lifting element, the at least one compressed air bore and the compressed air supply line being in flow communication with one another for blowing the compressed air upon the outer face of the lifting element to keep it clean.

12. A tool for machining bores which are centered on a bore axis extending along a workpiece, comprising:

a base body having a tool axis and a periphery which is spaced radially outwardly from the tool axis;

cutters mounted on the periphery of the base body for machining the bores, a lifting element with which the base body can be moved from an eccentric insertion position in relation to the bore axis into a central machining position, in which the tool axis of the base body coincides with the bore axis of the bores; and at least one supporting element which projects beyond the periphery of the base body.

13. The tool as claimed in claim 12, wherein an outer end of the at least one supporting element and an outer side of the lifting element lie in a common imaginary cylindrical surface upon displacement of the lifting element in an outer radial position corresponding to central machining position of the base body.

14. The tool as claimed in claim 12, wherein the at least one supporting element is provided rigidly on the base body.

15. The tool as claim in claim 1, wherein, during the machining of the workpiece, the base body has a periphery supported on at least one guide bearing.

16. The tool as claimed in claim 15, wherein the lifting element is radially adjustable, the base body resting with the radially adjustable lifting element on an inner ring of the at least one guide bearing.

17. The tool as claim in claim 15 further comprising another guide bearing, the at least one and other guide bearings being arranged between opposite ends of the workpiece or outside the workpiece.

18. The tool as claimed in claim 15 wherein the base body is rotatable about the tool axis in the central machining position, the base body further has at least one driver which extends radially outwardly from the periphery thereof and is positively connected to the guide bearing to rotate therewith in the central machining position of the base body.

19. The tool as claimed in claim 18, wherein the driver engages in an axial groove provided in the inner ring of the guide bearing.

20. The tool as claimed in claim 18, wherein, the driver and the cutters project to the same extent from the base body.

21. The tool as claimed in claim 2, wherein the lifting element is provided with a piston that can be displaced by a pressure medium.

22. The tool as claim in claim 5, wherein the restoring element is a restoring spring mounted radially in the base body and acting upon the lifting element so that the lifting element is biased radially inwardly.

23. The tool as claimed in claim 6, wherein the control rod is spaced radially inwardly from a periphery of the base body and displaceable axially relative thereto, the restoring element passes radially through the control rod.

24. The tool as claimed in claim 22, wherein the restoring element has a free end which is provided with a piston.

25. The tool as claimed in claim 24, wherein the piston of the restoring element has a face to which pressure can be applied and which is smaller than a face of the piston of the lifting element spaced radially from the face of the restoring element and being under counter pressure sufficient to displace the lifting element in the outer radial position after the base body is displaced in the predetermined axial position so as to enable the base body to move in the central machining position.

26. The tool as claimed in claim 22, wherein the restoring element is penetrated by a compressed-air bore, which has a flow connection to a compressed-air bore passing through the lifting element.

27. The tool as claimed in claim 26, wherein the compressed-air bore opens into the outer end of the supporting element.

28. The tool as claimed in claim 6, further comprising another control rod mounted in the base body parallel to the at least one control rod such that it can be axially adjusted, and wherein the at least one and other control rods can be operated independently of one another.

29. The tool as claimed in claim 28, wherein the control rods each has a semi-circular cross section.

30. The tool as claimed in claim 1, wherein the lifting element is rigidly connected to the base body.

31. The tool as claimed in claim 1, wherein the lifting element is formed in one piece with the base body.

32. The tool as claimed in claim 15, wherein the base body periphery includes a sleeve mounted on the base body and displaceable axially with the base body to the predetermined axial position thereof in which the sleeve is supported by the at least one guide bearing such that the sleeve is capable of rotating relative to the base body, the lifting element is mounted to the sleeve to enable the base body to move into the central machining position after the base body has reached the predetermined axial position.

33. The tool as claimed in claim 1, wherein the at least one lifting element has a frustoconical shape.

34. The tool as claimed in claim 1, wherein the base body has a leading base body section sized to have a first diameter and a trailing base body section sized to have a second diameter which is greater than the first diameter, the lifting element being provided at the transition between two the leading and trailing base body sections.

35. The tool as claimed in claim 1, wherein the base body has at least a second lifting element which is provided at an axial distance from the lifting element.

36. The tool as claimed in claim 35, wherein the at least second lifting element is provided at a free end of the base body.

37. The tool as claimed in claim 35, wherein the at least second lifting element has a shape of a truncated cone.

38. An elongated tool for machining a bore which is centered on a bore axis in a workpiece, the tool having:
 a base body having a tool axis;
 cutters mounted on the periphery of the base body for machining the bores,
 a lifting element with which the base body can be moved in the workpiece from an eccentric insertion position in relation to the bore axis into a central machining position, in which the tool axis of the base body coincides with the bore axis of the bores, and
 at least one measuring device mounted to the base body and operative to measure the machined bores.

39. The tool as claim in claim 38, wherein the measuring device has at least one measuring nozzle extending perpendicular to the tool axis and having an air-line which opens into a measuring face of the at least one measuring device which is spaced radially outwardly from the tool axis, the base body having a compressed-air bore in flow communication with the air-line to provide air into the air-line for measuring the machined bores.

40. The tool as claimed in claim 39, wherein the measuring device further has a centrifugal-force-controlled rocker provided with a mounting space which receives the at least one measuring nozzle, the centrifugal-force-controlled rocker having a pivot axis, which extends perpendicular to the tool axis and to the compressed-air bore, and rocking about the pivot axis between an inoperative position, in which a wall of the mounting space presses against the at least one measuring nozzle to block the air-line thereby preventing air from entering the machined bores, and a measuring position, in which the wall of the mounting space is displaced from the air-line to allow air to flow into the machined bores.

41. The tool as claimed in claim 40, wherein, at a working speed ($N_{work}$) of the tool, the centrifugal force-controlled rocker displaces the centrifugal force controlled rocker in the operative position to close the measuring nozzle.

42. The tool as claimed in claim 40, wherein the centrifugal force-controlled rocker is provided with a setting element operative to set a measuring gap between the measuring face of the rocker and a wall of the bores.

43. The tool as claimed in claim 38, further comprising a control rod concentric with the base body and displaceable relative thereto, the control rod being so shaped that as the control rod moves axially it pivots the centrifugal force rocker between the inoperative and measuring positions.

44. A tool having a base body which carriers cutters for machining bores in a workpiece, said cutters being arranged coaxially with one another, wherein the base body has at least one integrated lifting element, with which the base body can be moved from an eccentric insertion position in relation to an axis of the workpiece bores into a central position, in which the axis of the workpiece bores coincides with an axis of the base body.

45. A method for machining a bore centered on a bore axis in a workpiece, comprising the steps of:
 inserting an elongated base body in the workpiece such that the base body assumes an eccentric insertion position in which a longitudinal axis of the base body is spaced radially from the bore axis;
 displacing the base body axially along the workpiece to a predetermined position, in which a cutter mounted on the base body is located in front of the bore to be machined;
 adjusting a lifting element, which is mounted to the base body, in a direction transverse to the tool axis, thereby displacing the base body to a central machining position in which the axis of the base body coincides with the bore axis; and
 applying a torque to the base body as the base body is displaced axially, thereby machining the bore with the cutter after displacing the base body into the central machining position.

46. The method as claimed in claim 45, wherein the tool is adjusted from its eccentric position into its central position by axial displacement.

47. The method as claimed in claim 45, wherein, directly following the machining of the bores, their diameter is measured.

48. A method for machining a bore centered on a bore axis in a workpiece, comprising the steps of:
 inserting an elongated base body such that the base body assumes an eccentric position in which a longitudinal axis of the base body is spaced radially from a bore axis;
 displacing the base body axially along the workpiece to a predetermined axial position, in which a cutter mounted on the base body is located in front of the bore to be machined;
 displacing the base body in a direction transverse to the tool axis, thereby moving the base body to a central machining position in which the axis of the base body coincides with the bore axis;
 applying a torque to the base body while displacing the base body axially, thereby machining the bore;
 maintaining the base body in the bore and measuring a bore diameter immediately after terminating the rotational and axial displacement of the base body at the end of machining the bore.

49. A method for machining a workpiece bore centered on a bore axis by using a base body which has a body axis, a cutter projecting from the base body and a lifting element, the method comprising the steps of:
 inserting the base body in a workpiece such that the base body assumes an eccentric position in which the body axis is radially offset from the bore axis and the cutter is spaced radially inwardly from bore surface;

displacing the base body axially within the workpiece to a predetermined axial position;

stopping the displacement of the base body in the predetermined axial position in which the cutter is located in front of the workpiece bore;

acting upon the base body with the lifting element such that the base body is displaced from the eccentric position to a central machining position, in which the body axis coincides with the bore axis and the cutter is displaced radially toward the bore surface; and rotating the base body while advancing the base body axially such that the base body is maintained in the central machining position, thereby causing the cutter to machine the workpiece bore.

* * * * *